Dec. 3, 1929.    S. HANSON    1,738,428
DISPENSING MACHINE
Filed March 13, 1929

Inventor
SIGVORT HANSON,
James A. Walsh.
Attorney

Patented Dec. 3, 1929

1,738,428

UNITED STATES PATENT OFFICE

SIGVORT HANSON, OF RACINE, WISCONSIN, ASSIGNOR TO RACINE DISPENSER MANUFACTURING COMPANY, OF RACINE, WISCONSIN, A CORPORATION

DISPENSING MACHINE

Application filed March 13, 1929. Serial No. 346,711.

My invention relates to improvements in dispensing machines of the character disclosed in Letters Patent No. 1,633,207, issued June 21, 1927, and No. 1,659,772, issued February 21, 1928, upon my applications; my object being to provide simplified and highly effective means for agitating the powdered malted milk mass or similar material whereby the same becomes separated and in substantially loose condition for ready dispensation from the machine, as will further appear.

Figure 1:
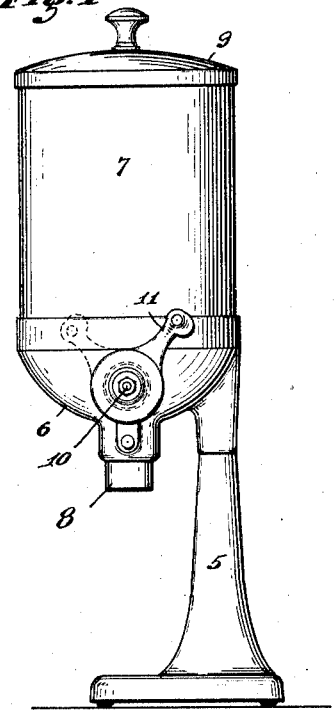
Figure 3:
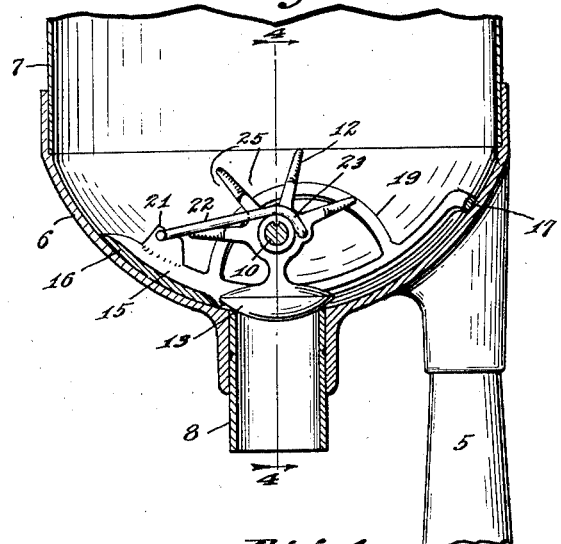
Figure 2:
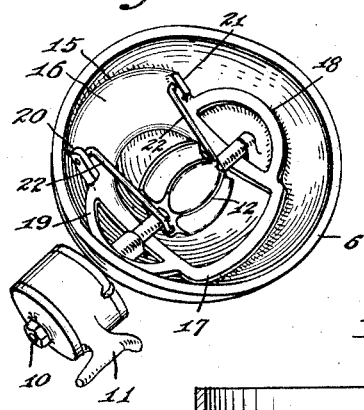
Figure 4:
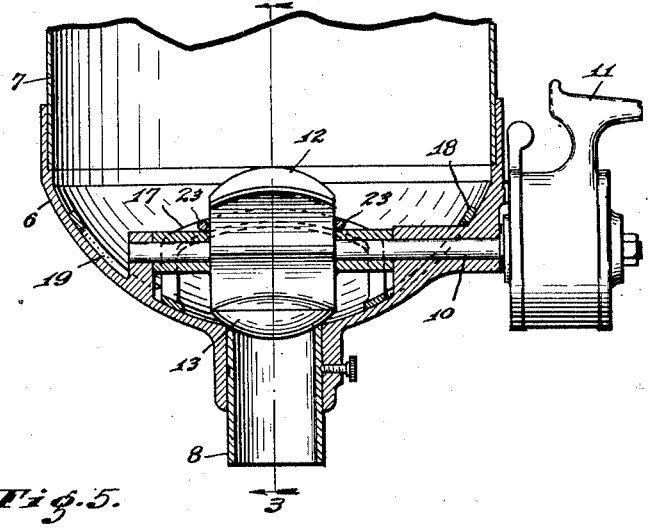
Figure 5:
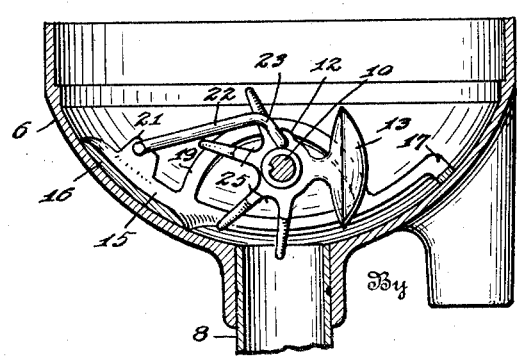

In the accompanying drawing, forming part hereof, Figure 1 is an elevation of a dispensing machine to which my improvement is applicable; Fig. 2, a plan as seen when looking into the bowl of the machine showing the agitator in the bottom of the bowl; Fig. 3, a vertical section taken on the dotted line 3—3 in Fig. 4 showing the discharger in closed position; Fig. 4 a vertical section taken on the dotted line 4—4 in Fig. 3; and Fig. 5 is a vertical section showing the discharger in dispensing position.

In said drawing, the numeral 5 indicates a stand upon which the dispenser is mounted, the latter comprising a bowl 6 and a material container 7 into which material is deposited to be dispensed through the outlet 8, said container being provided with a removable cover 9, all of which parts may be of any desired character and arrangement.

In the bowl 6 a rock-shaft 10 is mounted and actuated by a spring-controlled lever 11, and upon said shaft is mounted a combination discharger and closure 12, 13, the discharger comprising a plurality of graduated compartments, substantially in the manner disclosed in my said former patents, and therefore it is unnecessary to describe these features in detail.

In the bottom of the bowl 6 I secure an agitator 15 so formed as to follow the concave contour of the bowl and having an open base 16, 17, and side members 18, 19, formed to correspond to the contour of the bowl, said agitator being substantially of the character of an open-work frame through which the discharger 12, 13, directs material into the outlet 8 to be expelled therethrough into a glass or receptacle for serving beverage. At opposite sides of the agitator I provide bearings 20, 21, in which is mounted the arms 22 of a bail 23 which preferably passes through the discharger and is movable eccentrically in relation thereto and to the agitator.

In practice I have learned that by agitating the lower portion of the powered mass in the bowl there is sufficient disturbance imparted to the entire charge to destroy the cohesion thereof and loosen and separate the material into finely powdered form to be dispensed from the machine, so that by the simple device disclosed the material becomes thoroughly disintegrated into pulverulent condition to properly fill a predetermined compartment 25 of the discharger, which latter may be adjusted into fixed position in the manner disclosed in said patents. In operation it will be understood that material in the container 7 enters the bowl 6 and the compartment 25 of the discharger, and when shaft 10 is rocked by pulling lever 11 forwardly, as indicated by dotted lines in Fig. 1, the discharger also rocks, its closure moving away from the outlet 8 as indicated in Fig. 5 until a compartment 25 registers with the outlet and discharges its load thereinto, which operation occurs upon the forward pull of the lever. As said discharger revolves the bail 23 which is mounted therein and connected to the agitator actuates the latter to move forwardly, and upon release of the lever it automatically returns to the position indicated by full lines in Fig. 1, at the same time returning discharger 12 to closed position, as indicated in Fig. 3, the agitator through the action of the bail being simultaneously returned with the discharger as indicated in Fig. 3. It will therefore be apparent that by rocking the shaft in the manner described a rapid and somewhat violent reciprocating action in a curvilinear path will be imparted to the agitator and cause its base and side members to travel back and forth through the powdered mass, urging the material into a compartment 25, and thereby, in cooperation with the discharger, disturbs and separates the material to accomplish the result described, and as the lever is frequently operated to actuate said discharger and agitator together it will be understood that the material is quite often subjected to such agitation and thus prevented from packing or crystallizing in a manner well known.

I claim as my invention:

1. In a dispenser, a material receiving container, a discharger therein, a rock-shaft supporting the discharger, an agitator embodying a frame adjacent the discharger, means connecting the discharger and frame, and means for rocking said shaft and discharger and to simultaneously reciprocate the frame along the bottom of the container to agitate material to be dispensed by the discharger.

2. In a dispenser having a container embodying a concave bottom, a rock-shaft in the container, an agitator in the container conforming to the contour of said bottom, and means for actuating the rock-shaft to reciprocate the agitator along the bottom of the container.

3. In a dispensing machine having a container embodying a concave bottom, a rock-shaft in the container, an agitator comprising a frame embodying laterally extending members, said agitator conforming to the contour of the container, and means for actuating the rock-shaft to reciprocate the agitator along the bottom of the container and separate material to be dispensed from the machine.

4. In a dispensing machine, a material receiving container, a discharger therein, a rock-shaft supporting the discharger, an agitator in the container beneath the discharger and having an opening therein for the discharge of material therethrough, means connected the discharger and agitator, and means for actuating the rock-shaft to simultaneously rock the discharger and reciprocate the agitator.

5. In a dispenser, a material container, a rock-shaft therein, a discharger mounted on the shaft, an agitator beneath the discharger, a bail connected to the discharger and to one end of the agitator, and means for actuating the shaft to simultaneously rock the discharger and reciprocate the agitator to agitate and separate material in the container.

In testimony whereof I affix my signature.

SIGVORT HANSON.